(12) United States Patent
Rumeau

(10) Patent No.: US 9,211,952 B2
(45) Date of Patent: Dec. 15, 2015

(54) FOLDING TABLE SYSTEM WITH REMOVABLE EXTENSION AND RIGIDIFICATION ELEMENT, AND AIRCRAFT INCLUDING SUCH A SYSTEM

(71) Applicant: Airbus (SAS), Blagnac (FR)

(72) Inventor: Bernard Rumeau, Levignac (FR)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 14/309,101

(22) Filed: Jun. 19, 2014

(65) Prior Publication Data
US 2014/0373759 A1    Dec. 25, 2014

(30) Foreign Application Priority Data
Jun. 19, 2013    (FR) ...................................... 13 55784

(51) Int. Cl.
| | | |
|---|---|---|
| *A47B 23/00* | (2006.01) | |
| *B64D 11/00* | (2006.01) | |
| *A47B 1/05* | (2006.01) | |
| *A47B 5/04* | (2006.01) | |
| *A47B 31/06* | (2006.01) | |
| *B60N 3/00* | (2006.01) | |
| *B64D 11/04* | (2006.01) | |

(52) U.S. Cl.
CPC . *B64D 11/00* (2013.01); *A47B 1/05* (2013.01); *A47B 5/04* (2013.01); *A47B 31/06* (2013.01); *B60N 3/001* (2013.01); *B64D 11/04* (2013.01)

(58) Field of Classification Search
CPC ............. A47B 5/04; A47B 5/00; D06F 81/06
USPC ............ 108/38, 33, 40, 42, 48, 44, 69, 73, 75
See application file for complete search history.

(56) References Cited

U.S. PATENT DOCUMENTS

| | | | | | |
|---|---|---|---|---|---|
| 1,317,895 | A | * | 10/1919 | Rudy ............................... | 108/33 |
| 1,590,241 | A | * | 6/1926 | Grzeszkiewicz ................ | 108/38 |
| 1,809,866 | A | * | 6/1931 | Riesche .......................... | 108/38 |
| 2,616,774 | A | * | 11/1952 | Prince ............................. | 108/38 |
| 2,760,836 | A | * | 8/1956 | Fangman ........................ | 108/38 |
| 3,866,547 | A | * | 2/1975 | Guyton ........................... | 108/38 |
| 4,995,322 | A | * | 2/1991 | Frederick ........................ | 108/44 |
| 7,243,447 | B1 | * | 7/2007 | Springer ......................... | 108/69 |

(Continued)

FOREIGN PATENT DOCUMENTS

| | | |
|---|---|---|
| DE | 8600534 | 2/1986 |
| DE | 29820585 | 12/1999 |

(Continued)

OTHER PUBLICATIONS

French Search Report, Jan. 20, 2014.

*Primary Examiner* — Jose V Chen
(74) *Attorney, Agent, or Firm* — Greer Burns & Crain, Ltd.

(57) ABSTRACT

A folding table system includes a table and a removable extension, together with a rigidification element slidably mounted within a cavity made in the table such that a portion of the rigidification element can be inserted in a housing made in the removable extension so as to rigidify the assembly formed by the table and the removable extension. The removable character of the removable extension in particular allows the system to be deployed by passing around possible obstacles by an appropriate conformation of at least one edge of the abovementioned assembly.

13 Claims, 7 Drawing Sheets

(56) References Cited

U.S. PATENT DOCUMENTS

| | | | |
|---|---|---|---|
| 7,735,428 B2 * | 6/2010 | Petty | 108/40 |
| 7,950,336 B2 * | 5/2011 | Phillips | 108/64 |
| 8,100,062 B1 * | 1/2012 | Anghel | 108/69 |
| 2005/0087650 A1 | 4/2005 | Quan et al. | |
| 2013/0098276 A1 * | 4/2013 | Trinko | 108/33 |

FOREIGN PATENT DOCUMENTS

| | | |
|---|---|---|
| EP | 1172252 | 1/2002 |
| WO | 2012050587 | 4/2012 |

* cited by examiner

FOLDING TABLE SYSTEM WITH REMOVABLE EXTENSION AND RIGIDIFICATION ELEMENT, AND AIRCRAFT INCLUDING SUCH A SYSTEM

CROSS-REFERENCES TO RELATED APPLICATIONS

This application claims the benefit of the French patent application No. 1355784 filed on Jun. 19, 2013, the entire disclosures of which are incorporated herein by way of reference.

BACKGROUND OF THE INVENTION

The present invention relates to a folding table system, in particular for an aircraft such as an airplane.

Designers of aircraft, in particular airplanes, are constantly faced with the challenge of optimizing the use of the space available within the cabins of the aircraft.

In particular, certain cabin areas can form transit areas for the passengers during the boarding, deplaning and emergency evacuation phases, but not be required for such transit in the course of the flight.

Areas of this type may in particular be found close to certain doors of the aircraft.

It can thus be desirable to design a folding table system in such an area, to make use of the corresponding space in the course of the flight.

In particular, when a kitchen space is designed in such an area a folding table system can enable an additional working surface to be provided for the crew during the flight.

However, areas located near the doors can be obstructed with one or more fixed elements of the aircraft, such as a door hinge system, a unit, a caisson or any other type of element.

And such a fixed element forms an obstacle which may hinder the deployment of such a folding table system of a conventional type, consequently limiting the extent of a folding table which can be used in such an area.

SUMMARY OF THE INVENTION

One aim of the invention is notably to provide a simple, economic and efficient solution to this problem.

Its aim in particular is to propose a folding table system which can be used in an aircraft, where the extent of the table system is not limited by the presence of fixed elements of the aircraft in proximity.

To this end the invention proposes a folding table system including:

a bracket, a table including a first end rotationally mounted on the bracket, such that the table can be moved between a storage position in which the table covers a first side of the bracket, and a deployment position in which the table is separated from said first side of the bracket, a removable extension having a first end able to be connected to a second end of the table opposite said first end of the table, such that the removable extension extends the table when the table is in its deployment position, first retention means able alternatively to hold the table in its storage position, and to release the table so as to enable the table to be moved to its deployment position, and at least one rigidification element slidably mounted within a cavity formed within the table, and open in said second end of the table, such that an end portion of said rigidification element can be moved outside the cavity, and be inserted into a housing made in the removable extension, when said first end of the removable extension is connected to said second end of the table.

The system notably has the advantage that it occupies a small volume in its storage position, and provides a modular working surface by means of the removable extension, which enables the working surface formed by the table in its deployment position to be extended. The system is thus particularly useful to equip an area of the aircraft cabin used by passengers during boarding and deplaning, but which can be used for other purposes during the cruise phase.

In addition, since the extension is removable, i.e., independent of the table, the assembly formed of the table and the removable extension can pass around any obstacles, provided an appropriate conformation is given to at least one edge of this assembly. Indeed, such obstacles would form an obstacle to the deployment of a system of a known type, in which the extension is connected permanently to the table, for example by means of hinges. By allowing the connection between the table and the removable extension to be broken completely the invention enables the dimensional limits imposed by such obstacles on folding table systems of known types to be overcome.

Said at least one rigidification element preferably takes the form of a single rigidification panel.

The rigidification panel enables optimum rigidity to be given to the assembly formed of the table and the removable extension when the latter is connected to the table.

As a variant, said at least one rigidification element can take the form of multiple rigidification struts, without going beyond the scope of the invention.

Said first retention means preferentially include said at least one rigidification element and also a holding wall which is carried by said bracket and cooperating with said end portion of said rigidification element so as to hold said table in its storage position.

In one preferred embodiment of the invention said bracket includes a housing which is open on said first side of said bracket, and said housing is configured so that said removable extension can be housed in said housing, notably when said table is in its storage position.

The system advantageously includes second retention means able alternatively to hold said removable extension in said housing, and to release said removable extension.

In addition, the system preferably includes a notch one portion of which is formed of an edge of said folding table, and another portion of which is formed of an edge of said removable extension, where this latter edge extends from said edge of said folding table when said first end of said removable extension is connected to said second end of said table.

The system preferably includes a supporting device connected to said table in such a way that it is movable between a storage position, in which said supporting device is retracted in a housing formed in said table, and a deployed position, in which said supporting device extends outside said housing in order to contribute to holding said table in its deployment position.

The invention also relates to an aircraft including at least one folding table system of the type described above.

As explained above, said system preferably has a notch a portion of which is formed of an edge of said folding table, and another portion of which is formed of an edge of said removable extension, where this latter edge extends from said edge of said folding table when said first end of said removable extension is connected to said second end of said table.

In this case, a fixed element of the aircraft preferably extends at least partly into said notch.

Such a fixed element may consist of a door hinge system, or of any other element, such as a unit, a caisson, etc.

Furthermore, said removable extension advantageously has a second end, opposite said first end of the removable extension, which is supported on a fixed structure of the aircraft when said table is in its deployment position, and when said first end of said removable extension is connected to said table.

By way of example, the fixed structure may be formed of a shelf or of any other element forming a portion of a kitchen unit.

Said bracket also preferably extends orthogonally to a floor of said aircraft.

In this manner the encumbrance of the system in its storage position can be reduced optimally.

Said bracket can be attached to a pre-existing wall in the aircraft, in particular a wall connected to the floor of the aircraft, such as a side wall of a unit.

As a variant, the bracket may be incorporated into such a wall. The wall itself then constitute said bracket.

Furthermore, said predetermined position of the table in its deployment position is preferably a position in which said table extends horizontally, i.e., parallel to said floor.

BRIEF DESCRIPTION OF THE DRAWINGS

The invention will be better understood, and other details, advantages and characteristics of it will appear, on reading the following description given as a non-restrictive example, with reference to the appended illustrations, in which.

In all these figures, identical references may designate identical or comparable elements.

DETAILED DESCRIPTION OF THE PREFERRED EMBODIMENTS

Figure 1:
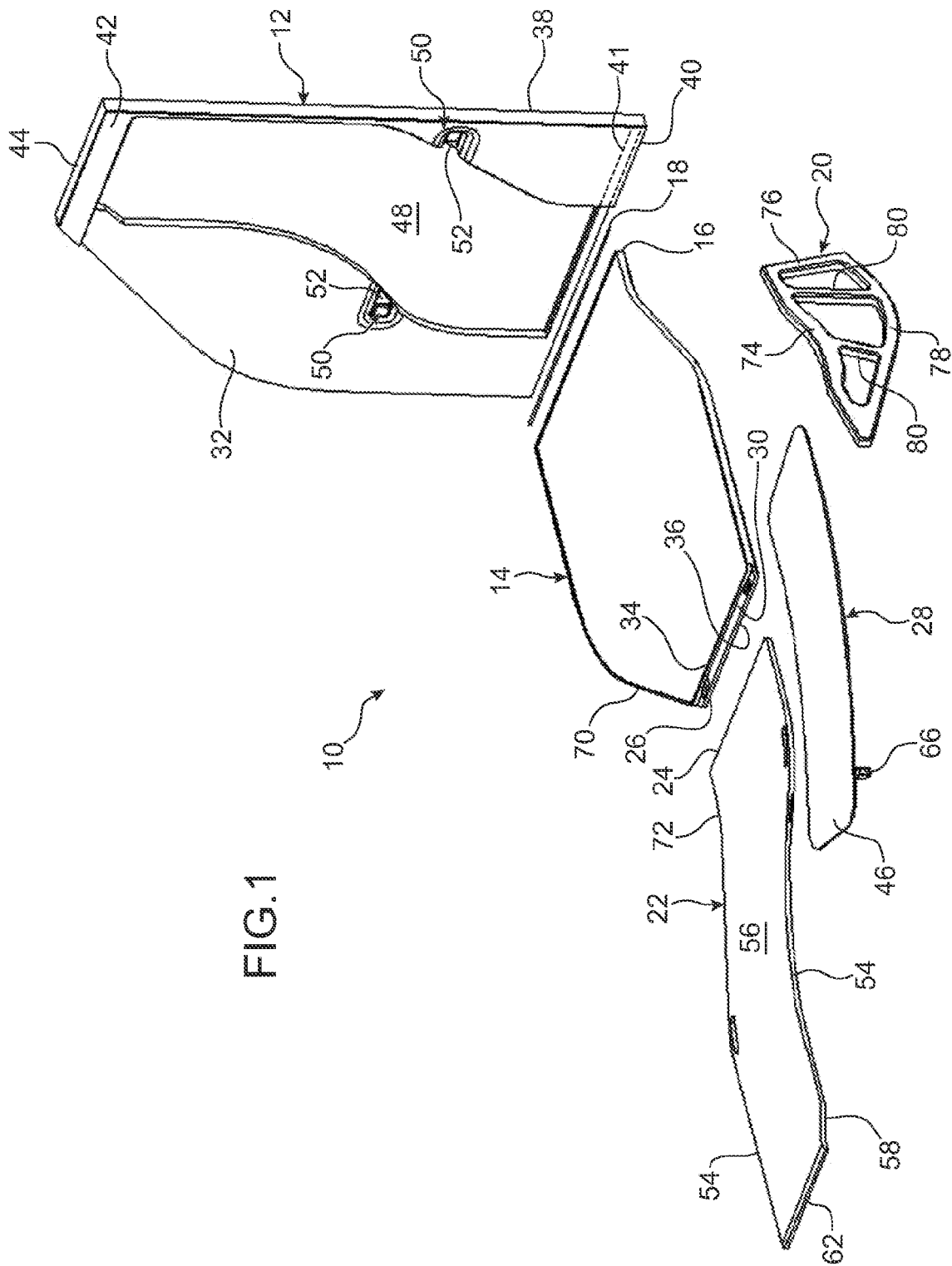
FIG. 1 is a schematic exploded view of a folding table system according to a preferred embodiment of the invention.

FIG. 1 illustrates a folding table system 10 according to a preferred embodiment of the present invention.

This system includes a bracket 12, a table 14 having a first end 16 rotationally mounted on bracket 12 on a joint pin 18, a supporting device 20, a removable extension 22 having a first end 24 able to be connected to a second end 26 of table 14 opposite first end 16 of the latter, and a rigidification panel 28 slidably mounted in a cavity 30 of table 14 emerging outside in the area of second end 26 of table 14.

Figure 5:
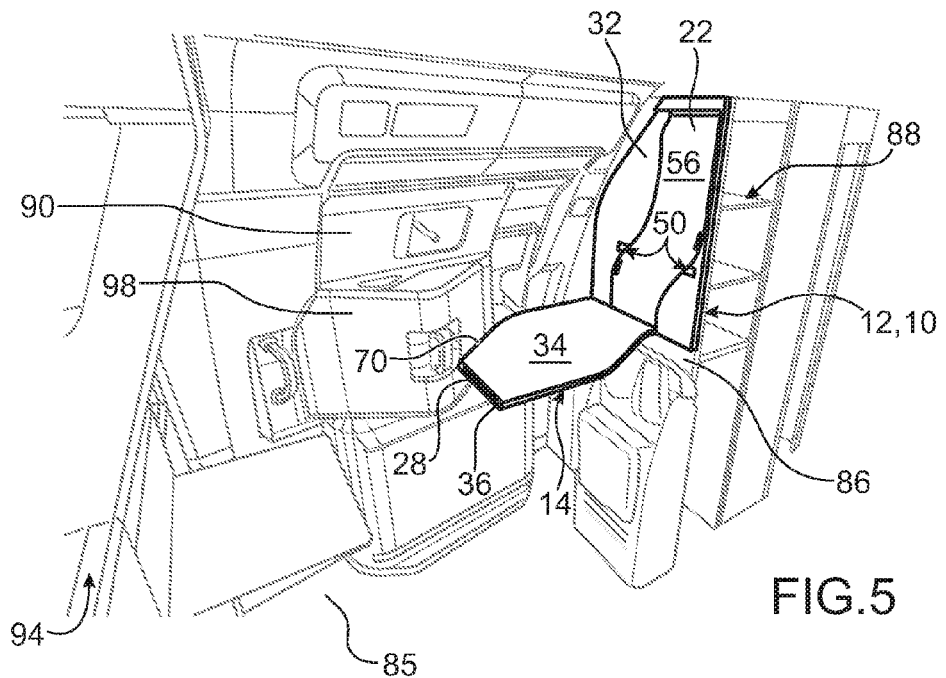

Table 14 can thus be moved between a storage position in which the table covers a first side 32 of bracket 12 (FIG. 2), and a deployment position in which the table is separate from first side 32 of the bracket (FIG. 5).

Table 14 comprises a table panel formed of a first plate 34 (FIG. 1) intended to be positioned on an upper side of the table when the table is in its deployment position, to act as a working surface, and of a second plate 36 opposite. In the storage position first plate 34 is opposite first side 32 of bracket 12. The two plates 34 and 36 delimit cavity 30 of table 14. Second plate 36 includes a main portion having a shape roughly identical to first plate 34 and an extension portion which extends beyond first plate 34 in the area of second end 26 of the table, so that the first end of removable extension 22 can rest on this extension portion. The two plates 34 and 36 are connected to one another by their side edges. These plates are preferably formed of a single block. In this case the table is made from a single plate in which a recess is made from an edge of the plate so as to form cavity 30.

Bracket 12 has, overall, the shape of a plate having a second side 38 opposite first side 32, and intended to be attached to a wall, preferably a vertical wall, as will be shown more clearly in what follows.

Bracket 12 includes, near its lower end 40, a bore 41 to receive joint pin 18.

In addition, bracket 12 includes a holding wall 42 at its upper end 44. This holding wall 42 is intended to form a stop with regard to an end portion 46 of rigidification panel 28 so as to hold table 14 in its storage position, as will be shown more clearly in what follows. Rigidification panel 28 and holding wall 42 thus form jointly "first retention means," in the terminology of the invention.

Furthermore, bracket 12 includes a recess which has a shape which is roughly conjugate with the shape of removable extension 22, and thus forming a housing 48 open at least on first side 32 of bracket 12, in which removable extension 22 can be housed, notably when table 14 is in its storage position. Housing 48 is surrounded by edges of the plate forming bracket 12.

Figure 1A:
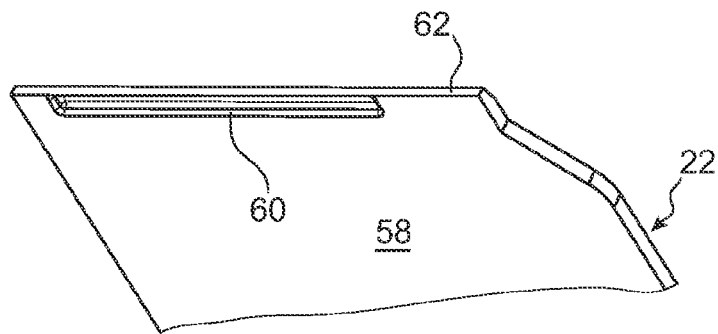
FIGS. 1a and 1b are partial schematic views at a larger scale of a removable extension belonging to the system of FIG. 1.
Figure 1B:
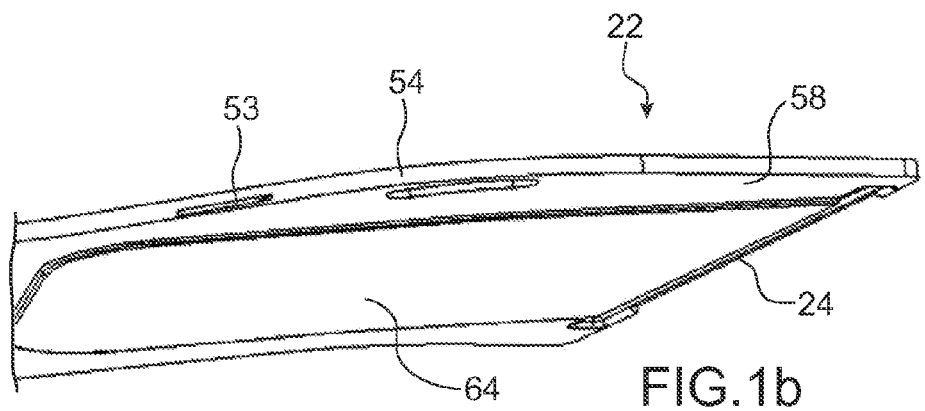

Bracket 12 includes two handles 50 (FIG. 1) positioned either side of housing 48 and slidably mounted in a direction parallel to joint pin 18. These handles 50 are fitted with respective tongues 52 which can penetrate into corresponding cavities 53 formed in two opposite edges 54 of the removable extension 22 (FIGS. 1 and 1b) so as to hold removable extension 22 within housing 48. Bracket 12 also includes elastic means (not represented) each of which applies force to handles 50 in the direction of housing 48.

Handles 50 form "second retaining means" in the terminology of the invention.

Removable extension 22 consists of an extension panel which has a first face 56 (FIG. 1) intended to be pointing upwards when first end 24 of the removable extension is connected to second end 26 of table 14, and a second opposite face 58.

Removable extension 22 includes a groove 60 (FIG. 1a) formed in its second face 58 near a second end 62 of the removable extension opposite its first end 24 and intended to receive an element of conjugate shape coupled with a fixed structure of the aircraft such as a kitchen unit to contribute to holding removable extension 22 in position, as will be shown more clearly in what follows.

In addition, removable extension 22 includes a recess 64 (FIG. 1b) formed in its second face 58, and extending as far as first end 24 of the removable extension. This recess 64 forms a housing intended to receive a portion of rigidification panel 28 so as to rigidify the assembly formed of table 14 and removable extension 22.

Figure 1C:
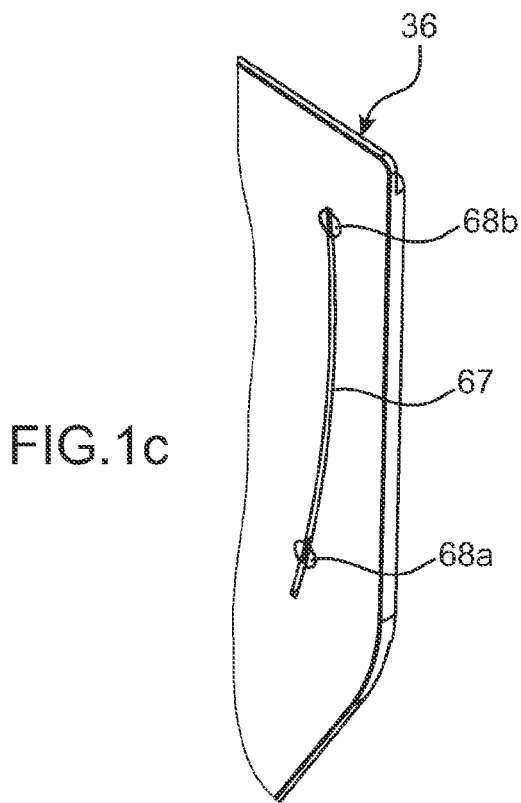
FIG. 1c is a partial schematic view at a larger scale of a plate forming a part of the table belonging to the system of FIG. 1.

This rigidification panel 28 includes a handle 66 (FIG. 1) which is, for example, screwed on to a rod (not visible in the figures) traversing a slot 67 formed in second plate 36 of table 14 (FIG. 1c). In addition, handle 66 has two stop pins (not visible in the figures) extending from either side of the abovementioned rod and parallel to it, i.e., orthogonally to second plate 36. Slot 67 communicates with two slot extensions 68a, 68b (FIG. 1c), which take, for example, the form of disks or circles centered on slot 67 and separated from one another. These slot extensions 68a, 68b are intended to receive the abovementioned stop pins when handle 66 is pointing roughly orthogonally relative to slot 67, so as to prevent the handle sliding unexpectedly along slot 67. Conversely, when the handle is pointing roughly parallel to slot 67 the stop pins penetrate in slot 67 themselves such that handle 66 can be moved along slot 67 and carry rigidification panel 28 with it.

When first end 24 of the removable extension is connected to second end 26 of table 14, the assembly formed by table 14 and removable extension 22 has a notch or cut-out, a portion of which is formed of an edge 70 of table 14, and another portion of which is formed of an edge 72 of removable extension 22 extending from abovementioned edge 70 of table 14, as will be shown more clearly in what follows.

Supporting device 20 includes, for example, a first strut 74 connected to second plate 36 of table 14, a second strut 76 roughly orthogonal to first strut 74 and having a first end connected to a first end of first strut 74, and a third strut 78 connecting a second end of first strut 74 to a second end of second strut 76 and forming by this manner a support leg for table 14. In the illustrated example first and third struts 74 and 78 are also connected to one another by two reinforcement struts 80.

Table 14 includes a housing 82 formed in its second plate 36 to receive supporting device 20 in the storage position. This housing is formed of an assembly of grooves arranged such that the housing has a shape which is roughly complementary to the shape of supporting device 20.

Table 14 also includes a handle 84 similar to handles 50, and associated with elastic means in a comparable manner, so as to hold supporting device 20 in housing 82.

FIGS. 2 to 6 illustrate the interior of a cabin of an aircraft, such as a commercial airplane, and show in particular an area equipped with folding table system 10 described above.

Bracket 12 of this system extends orthogonally to a floor 85 of the cabin of the aircraft. In the illustrated example bracket 12 is attached to a vertical wall 86 which constitutes, for example, a side panel of a column of shelves 88 (FIG. 5). This vertical wall is attached to floor 85. In addition, vertical wall 86 is positioned near a door 90 of the aircraft.

Figure 2:
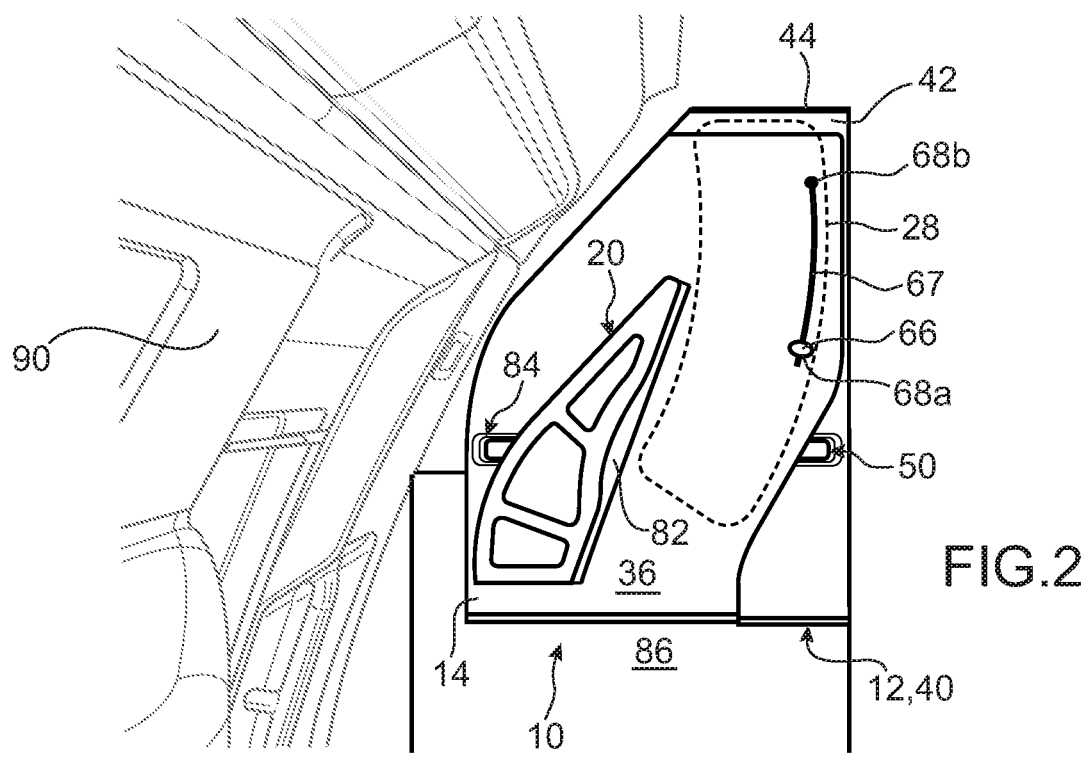
FIG. 2 is a partial schematic perspective view of a cabin of an aircraft including the folding table system of FIG. 1, where the latter is illustrated in a state of storage.

FIG. 2 illustrates system 10 in a storage state. Removable extension 22 is housed in housing 48 (FIG. 1) of support 12, and is masked by table 14 which is folded so as to cover first side 32 of the bracket.

Table 14 is itself held in storage position by the portion of end 46 of rigidification panel 28 which protrudes from cavity 30 of the table and cooperates by reciprocal stop with holding wall 42 of bracket 12. Handle 66 of the rigidification panel is pointing roughly orthogonally with slot 67 such that the stop pins coupled with this handle extend within a first 68a of the slot extensions and by this means prevent handle 66 from moving along slot 67, thus preventing end portion 46 of rigidification panel 28 from being retracted into cavity 30 of table 14.

In addition, supporting device 20 is folded in housing 82 and blocked by handle 84.

Figure 3:
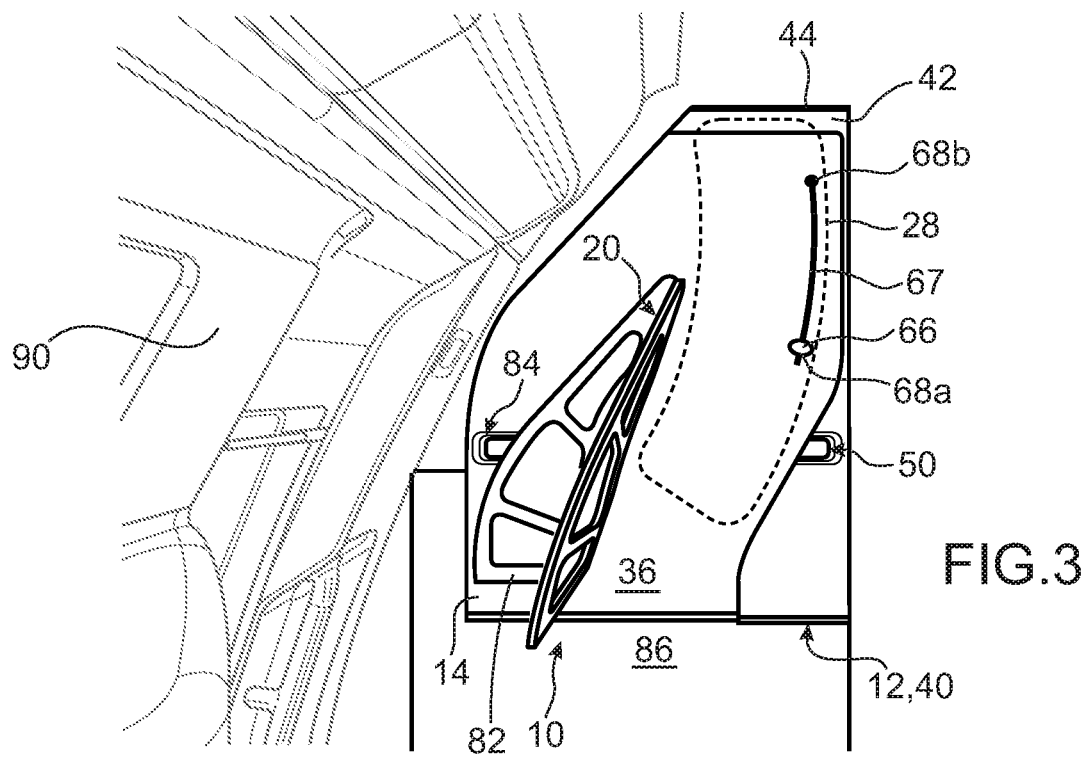
FIGS. 3 to 6 are partial schematic perspective views of the aircraft cabin of FIG. 2, illustrating respectively successive steps of a method of deployment of said folding table system.

FIG. 3 illustrates a first step of a method of deployment of folding table system 10.

This step relates to the deployment of supporting device 20, and involves manipulating handle 84 so as to move this handle in the direction opposite supporting device 20 in order to release the latter, followed by the pivoting of supporting device 20.

Figure 4:
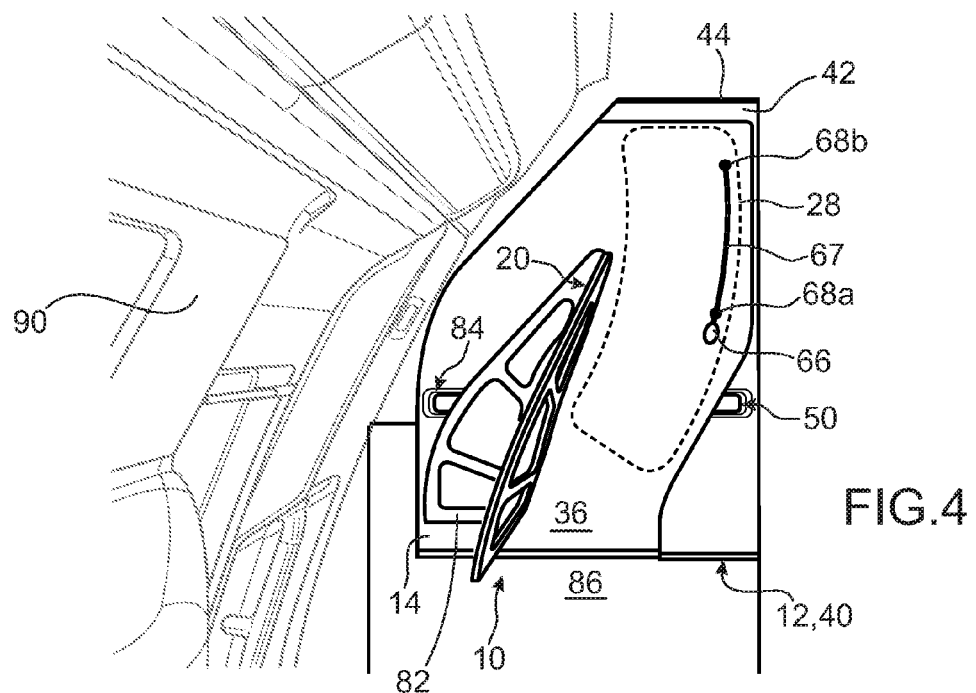

FIG. 4 illustrates a subsequent step of the method, in which handle 66 is rotated such that the stop pins extend into slot 67, and then handle 66 is moved downwards, i.e., towards first end 16 of table 14 such that rigidification panel 28 is retracted fully into cavity 30 and ceases by this means to cooperate by reciprocal stop with holding wall 42 of bracket 12.

FIG. 5 illustrates a subsequent step of the method, in which table 14 is deployed by pivoting around joint pin 18, until supporting device 20 comes to a stop against vertical wall 86 on to which bracket 12 is attached.

Figure 6:
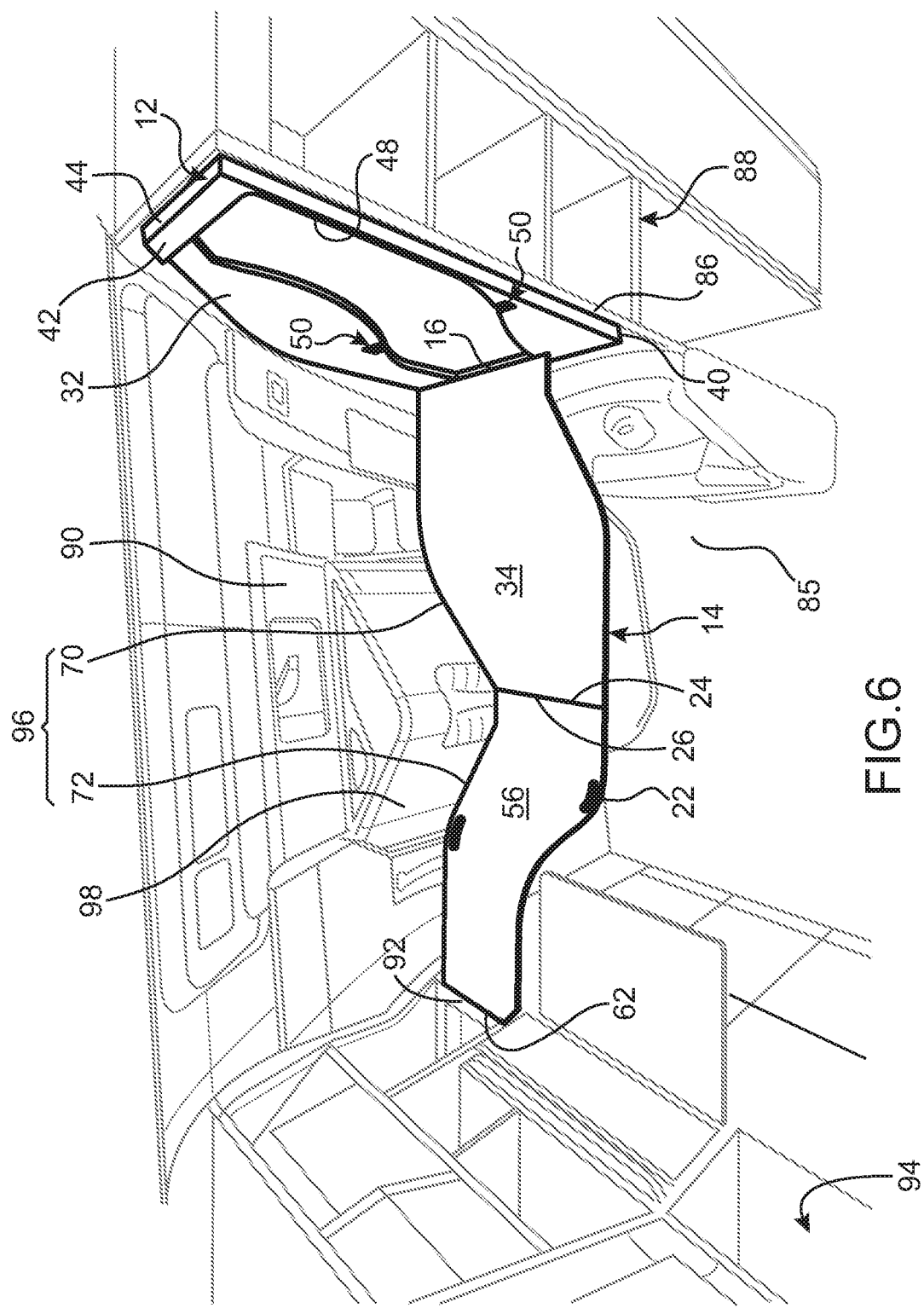

FIG. 6 illustrates a subsequent step of the method, in which handles 50 are manipulated simultaneously so as to release removable extension 22, and then the latter is positioned to extend table 14 such that first end 24 of removable extension 22 is in contact with second end 26 of table 14, and is in particular placed on the extension portion of second plate 36 of table 14 which extends beyond first plate 34 of the latter, and such that first face 56 of removable extension 22 is pointing upwards. In the illustrated example the extension portion of second plate 36 is engaged in an end portion of recess 64 of removable extension 22.

Second end 62 of removable extension 22 lies on a fixed structure 92 of the aircraft, such as a shelf belonging to a kitchen unit 94. Groove 60 in second face 58 of extension 22 pointing downwards may receive an element coupled with said shelf 92 (not visible in the figures), so as to stabilize removable extension 22.

Figure 7:
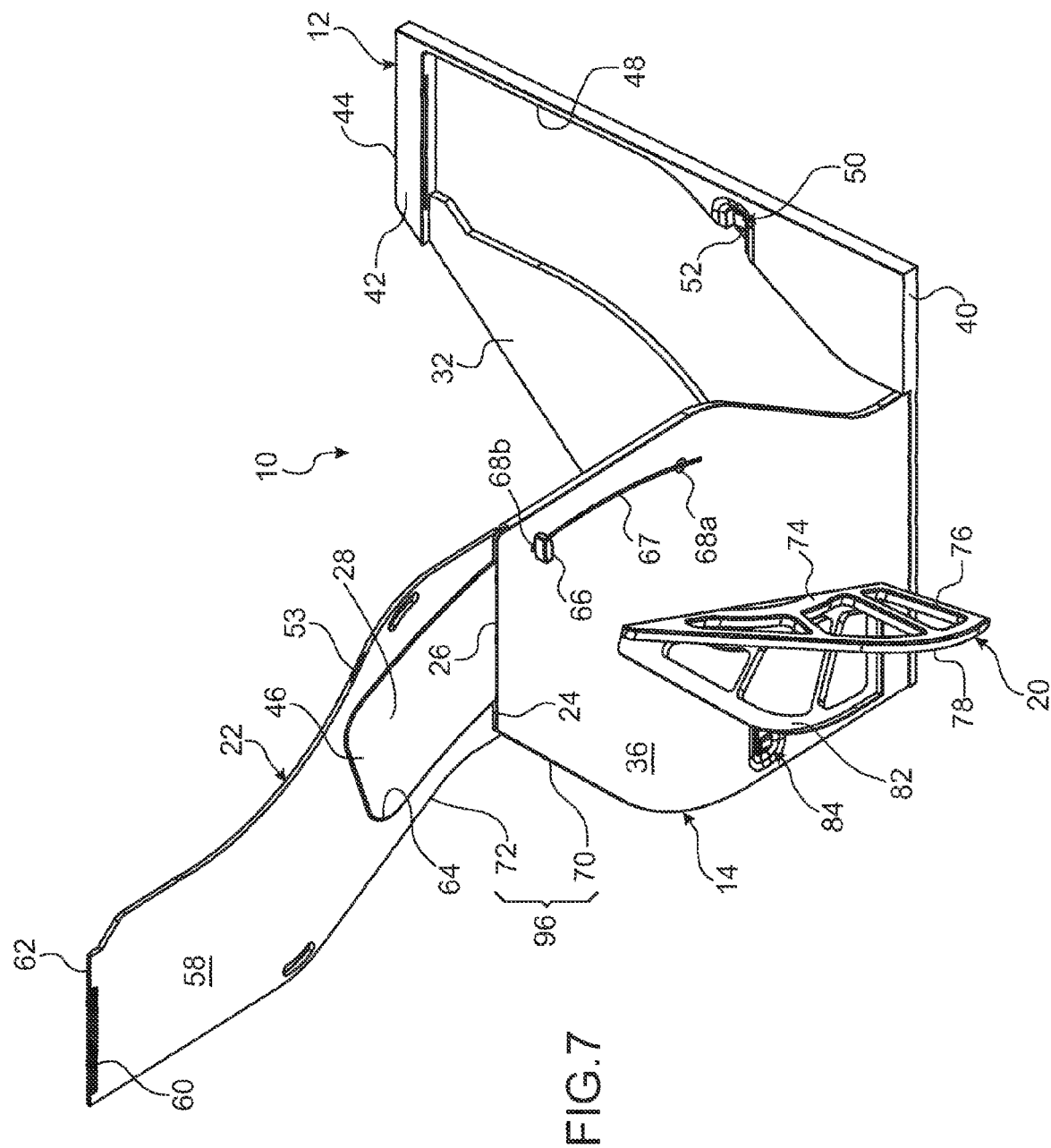
FIG. 7 is a view of the folding table system belonging to the aircraft cabin of FIG. 2, but represented isolated, where this figure illustrates a last step of the method of deployment of said folding table system.

FIG. 7 illustrates a subsequent step of the method, in which handle 66 which is coupled with rigidification panel 28 is moved along slot 67 in the direction of second end of table 14, so as to introduce a portion of rigidification panel 28 (including said end portion 46) in recess 64 of extension 22, until the stop pins coupled with handle 66 are engaged in the second extension of slot 68b so as once again to block handle 66 against any movement along slot 67. When handle 66 reaches this position rigidification panel 28 preferably occupies roughly the entire recess 64.

Rigidification panel 28 consequently contributes effectively to the rigidification of the assembly formed by table 14 and removable extension 22.

Figure 8:
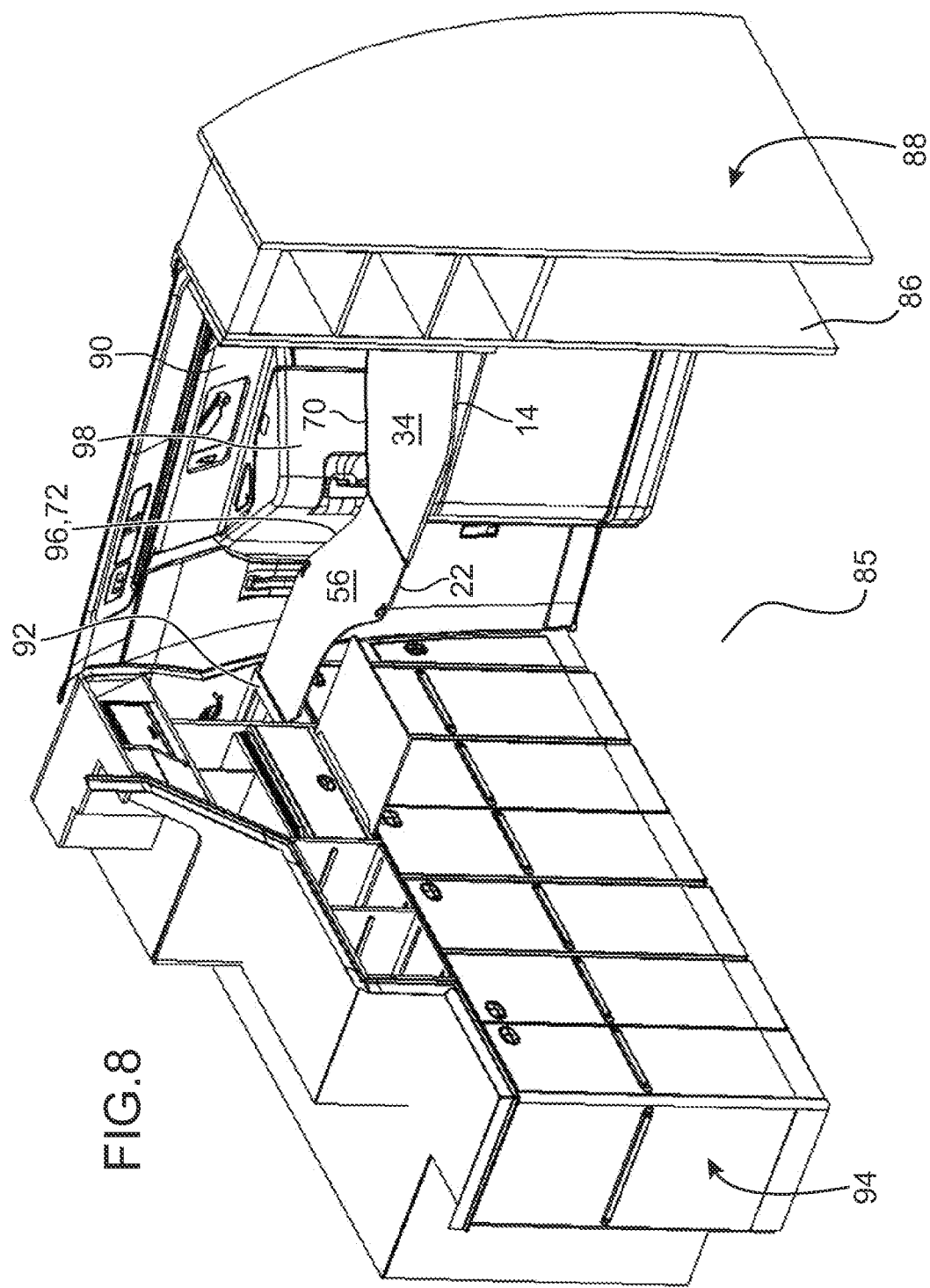
FIG. 8 is a partial schematic perspective view of the aircraft cabin of FIG. 2, illustrating said folding table system in a state of deployment.

FIG. 8 illustrates folding table system 10 in its state of deployment within the aircraft cabin. This figure in particular allows notch or cut-out 96, formed jointly by edge 70 of folding table 14 and edge 72 of removable extension 22, to be seen.

A fixed element 98 of the aircraft, such as a system for connecting door 90 to the fuselage, occupies a portion of the space delimited by abovementioned notch 96.

Folding table system 10 thus has the advantage that it can pass round such a fixed element 98 without the latter hindering the deployment and storage of the system.

This results in optimized use of the space available on board the aircraft.

The system can in particular be deployed during the phases of flight at altitude, called the "cruise" phases, and be stored during the phases of landing and takeoff, and on the ground, when the area otherwise occupied by the system in its deployment position is used by the passengers of the aircraft for boarding or deplaning.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A folding table system, comprising:
    a bracket,
    a table including a first end rotationally mounted on said bracket such that said table is movable between a storage position in which said table covers a first side of said bracket, and a deployment position in which said table is separated from said first side of said bracket,
    a removable extension having a first end connectable to a second end of the table opposite said first end of the table, such that said removable extension extends the table when the table is in the deployment position,
    a first retainer maintaining the table in said storage position and releasable to allow said table to rotate to said deployment position, and
    at least one rigidification element slidably mounted within a cavity provided within said table, and extendable from an opening at said second end of said table, such that an end portion of said rigidification element is movable outside the cavity, and is insertable into a portion of said removable extension and housed therein, when said first end of said removable extension is connected to said second end of said table in said deployment position.

2. The system according to claim 1, in which said at least one rigidification element is a unique rigidification panel.

3. The system according to claim 1, in which said first retainer includes said at least one rigidification element and also a holding wall on said bracket wherein engagement between said end portion of said at least one rigidification element and said holding wall maintains said table in the storage position.

4. The system according to claim 1, in which said bracket includes a recess open in said first side of said bracket, in which said removable extension can be housed, when said table is in its storage position.

5. The system according to claim 1, including a second retainer maintaining said removable extension within said recess in said bracket and releasable to allow said removable extension to be moved from said recess in said bracket.

6. The system according to claim 1, including a supporting device connected to said table in such a way that it can be moved between a storage position, in which said supporting device is located within a housing formed in said table, and a deployed position, in which said supporting device extends outside said housing in order to contribute to holding said table in its deployment position.

7. The system according to claim 1, having a notch, a portion of which is formed by one edge of said table, and another portion of which is formed by an edge of said removable extension, extending as an extension of said edge of said table, when said first end of said removable extension is connected to said second end of said table.

8. An aircraft including at least one folding table system, comprising:
    a bracket,
    a table including a first end rotationally mounted on said bracket such that said table is movable between a storage position in which said table covers a first side of said bracket, and a deployment position in which said table is separated from said first side of said bracket,
    a removable extension having a first end connectable to a second end of the table opposite said first end of the table, such that said removable extension extends the table when the table is in the deployment position,
    a first retainer maintaining the table in said storage position and releasable to allow said table to rotate to said deployment position, and
    at least one rigidification element slidably mounted within a cavity provided within said table, and extendable from an opening at said second end of said table, such that an end portion of said rigidification element is movable outside the cavity, and is insertable into a portion of said removable extension and housed therein, when said first end of said removable extension is connected to said second end of said table in said deployment position.

9. The aircraft according to claim 8, in which said removable extension has a second end, opposite said first end of the removable extension, which is supported by a portion of the aircraft when said table is in its deployment position, and when said first end of said removable extension is connected to said second end of said table.

10. The aircraft according to claim 8, in which said bracket extends orthogonally to a floor of said aircraft.

11. The aircraft according to claim 8, the folding table system having a notch, a portion of which is formed by one edge of said table, and another portion of which is formed by an edge of said removable extension, extending as an extension of said edge of said table, when said first end of said removable extension is connected to said second end of said table, wherein a fixed element of the aircraft extends at least partly into said notch.

12. The aircraft according to claim 11, wherein said removable extension has a second end, opposite said first end of the removable extension, which is supported by a portion of the aircraft when said table is in its deployment position, and when said first end of said removable extension is connected to said second end of said table.

13. The aircraft according to claim 11, in which said bracket extends orthogonally to a floor of said aircraft.

* * * * *